(12) United States Patent
Bisgaard et al.

(10) Patent No.: US 12,401,952 B2
(45) Date of Patent: Aug. 26, 2025

(54) METHOD FOR CHARGING A BATTERY OF A HEARING DEVICE

(71) Applicant: GN Hearing A/S, Ballerup (DK)

(72) Inventors: Nikolai Bisgaard, Lyngby (DK); Kim Rasmussen, Ballerup (DK)

(73) Assignee: GN HEARING A/S, Ballerup (DK)

(*) Notice: Subject to any disclaimer, the term of this patent is extended or adjusted under 35 U.S.C. 154(b) by 134 days.

(21) Appl. No.: 17/714,097

(22) Filed: Apr. 5, 2022

(65) Prior Publication Data
US 2022/0272461 A1 Aug. 25, 2022

Related U.S. Application Data

(63) Continuation of application No. PCT/EP2020/083257, filed on Nov. 24, 2020.

(30) Foreign Application Priority Data

Dec. 6, 2019 (EP) .................................. 19214180

(51) Int. Cl.
*H04R 25/00* (2006.01)
*H02J 7/00* (2006.01)
(Continued)

(52) U.S. Cl.
CPC ............ *H04R 25/30* (2013.01); *H02J 7/0049* (2020.01); *H02J 50/10* (2016.02); *H02J 50/80* (2016.02);
(Continued)

(58) Field of Classification Search
CPC .. H04R 25/30; H04R 25/554; H04R 2225/31; H04R 2225/55; H02J 7/0049; H02J 50/10; H02J 50/80
(Continued)

(56) References Cited

U.S. PATENT DOCUMENTS

| 2012/0189146 | A1 | 7/2012 | Wuidart |
| 2013/0343585 | A1* | 12/2013 | Bennett .................. H04W 4/80 |
| | | | 381/317 |

(Continued)

FOREIGN PATENT DOCUMENTS

| EP | 3 076 264 A1 | 10/2016 |
| EP | 3493556 | 6/2019 |

(Continued)

OTHER PUBLICATIONS

PCT International Search Report and Written Opinion for International Appln. No. PCT/EP2020/083257 dated Mar. 29, 2021.

(Continued)

*Primary Examiner* — Ivian C Chin
*Assistant Examiner* — Con P Tran
(74) *Attorney, Agent, or Firm* — Vista IP Law Group, LLP (57) ABSTRACT

The present disclosure relates to an application to be executed by an electronic device. The electronic device communicates with a hearing device worn by a user. The hearing device comprises a battery and a processing unit configured to receive an input signal and provide a processed output signal for compensating a hearing loss of the user. The application is configured for transmitting a status request from the electronic device to the hearing device, receiving, at the electronic device, a status response from the hearing device, and generating a notification representing instructions for charging the battery. The notification is generated based on the received status response and predetermined settings of the application.

23 Claims, 6 Drawing Sheets

(51) Int. Cl.
*H02J 50/10* (2016.01)
*H02J 50/80* (2016.01)

(52) U.S. Cl.
CPC ....... *H04R 25/554* (2013.01); *H04R 2225/31* (2013.01); *H04R 2225/55* (2013.01)

(58) Field of Classification Search
USPC .............. 381/58, 60, 312; 600/559; 455/573
See application file for complete search history.

(56) References Cited

U.S. PATENT DOCUMENTS

| | | | | |
|---|---|---|---|---|
| 2014/0140554 | A1* | 5/2014 | Ruaro | H04R 25/554 381/315 |
| 2014/0197802 | A1* | 7/2014 | Yamazaki | H01M 10/0525 320/137 |
| 2017/0013369 | A1* | 1/2017 | Renken | H02J 7/0048 |
| 2018/0078329 | A1 | 3/2018 | Hansen et al. | |
| 2019/0268706 | A1 | 8/2019 | Solum et al. | |
| 2020/0120428 | A1* | 4/2020 | Gehring | H04R 25/554 |

FOREIGN PATENT DOCUMENTS

| WO | WO 2011/159349 | 12/2011 |
|---|---|---|
| WO | WO 2014/088164 | 6/2014 |
| WO | WO 2016/163610 | 10/2016 |
| WO | WO 2017/084686 | 5/2017 |
| WO | WO 2018/057656 | 3/2018 |
| WO | WO 2019/045681 | 3/2019 |

OTHER PUBLICATIONS

Extended European Search Report for EP Patent Appln. No. 19214180.2 dated Jul. 30, 2020.

* cited by examiner

METHOD FOR CHARGING A BATTERY OF A HEARING DEVICE

RELATED APPLICATION DATA

This application is a continuation of International Patent Application No. PCT/EP2020/083257 filed on Nov. 24, 2020, which claims priority to, and the benefit of, European Patent Application No. 19214180.2 filed on Dec. 6, 2019. The entire disclosures of the above applications are expressly incorporated by reference herein.

FIELD

The present disclosure relates to charging of a hearing device. In particular, the present disclosure relates to a system, a method, and an application, where the application is configured to be executed by an electronic device, wherein the electronic device is configured to communicate with a hearing device. The hearing device is configured to be worn by a user, the hearing device comprises a battery, and a processing unit configured to receive an input signal and provide a processed output signal for compensating a hearing loss of the user.

BACKGROUND

Rechargeable hearing aids are gaining popularity because they require low maintenance compared to traditional hearing aids with alkaline batteries. The rechargeable hearing aids do not generate an extra cost for a user, as there is no need for purchasing a new battery every time an old battery is drained.

Although the rechargeable hearing aids are easy to use, there is still a need for their regular recharging and for some special care related to recharging in order to extend the life of the battery in the rechargeable hearing aid. Therefore, there is a need for a method which controls and helps a user to manage a recharging process of the hearing aid.

SUMMARY

It is an object of the embodiments to provide a method for controlling and managing recharging of a hearing device.

It is a further object of the embodiments to provide a guidance for a user of a hearing device on how to extend the life of a battery in the hearing device.

In a first aspect, discloses is an application to be executed by an electronic device. The electronic device is configured to communicate with a hearing device. The hearing device is configured to be worn by a user. The hearing device comprises a battery and a processing unit. The processing unit is configured to receive an input signal and provide a processed output signal for compensating a hearing loss of the user. The application is configured for transmitting a status request from the electronic device to the hearing device. The application is configured for receiving, at the electronic device, a status response from the hearing device. The application is configured for generating a notification representing instructions for charging the battery, the notification being generated based on the received status response and predetermined settings of the application.

In the present context, the term "application" is to be interpreted as a computer implemented method, i.e. a method carried out by an electronic device which is a programmable apparatus. The application is executed on an electronic device and partly enables information exchange between the electronic device and a hearing device paired with the electronic device. The application does not necessarily require the electronic device to be connected to the Internet, only connection to the hearing device may be needed.

The electronic device may be a smart phone, such as a mobile phone, of the user of the hearing device or a mobile phone of a person helping the hearing device user to manage the recharging process. The user of the mobile phone can install the application and adjust recharging settings according to the type of the battery/hearing device and according to personal preferences. The electronic device may be any other portable device, such as a laptop, tablet, or another device which is capable to provide interactive communication with the user of the hearing aid and/or with the person helping the hearing device user to manage the recharging process. Furthermore, the electronic device may be a device which the user of the hearing device uses the most throughout a day. Having the application running on the electronic device provides the user with a user-friendly software application running on a device which is frequently used by the user. The application may be executed on more than one electronic device, providing a flexibility for the user, and possibility to be prompted and reminded to charge the hearing device by an electronic device which the user currently uses.

The electronic device communicates with a hearing device. The electronic device is typically in a wireless communication with the hearing device. The hearing device may send signals to the electronic device and the electronic device may send signals to the hearing device exploiting, e.g., Bluetooth technology or other wireless communication technology for exchanging data over short distances. The hearing device may have a wireless chip operating at 2.4 GHz and communicating with the electronic device, such as the user's smart phone. Alternatively, the hearing device and electronic device may communicate via a wired technology.

The hearing device is configured to be worn by a user. The hearing device may be any hearing device providing sound to a user. The hearing device is typically a hearing aid programmed/configured to compensate for a hearing loss of the user who is a hearing-impaired person. The hearing device may have additional features, e.g. the hearing device may be configured to stream audio content to the user, it may be configured for user's speech extraction, etc. The hearing device may be an in-the-ear (ITE) hearing aid or behind-the-ear (BTE) hearing aid. In some embodiments, a hearing device may be provided having a BTE module, an ITE module, and a connection between the two modules, such as a tube module. Typically, the hearing instrument components may be distributed between the modules. In many hearing devices, the receiver may be positioned in the ITE module. These devices are often referred to as receiver in canal (RIC) hearing aids. The hearing device may comprise two hearing aids allowing for binaural hearing.

In some embodiments, the hearing device comprises at least one ITE or completely-in-the-canal module. The at least one in-the-ear module or completely-in-the-canal module may be positioned in the ear of the user when provided in its intended operational position. The ITE module may comprise at least the processing unit and an antenna element.

The hearing device may be a completely-in-the-canal (CIC) type hearing aid in which the hearing device is provided in the ear of a user. Thus, in some embodiments, the ITE module comprises all hearing device components, including the processing unit, battery, a wireless communication unit, microphone, speaker, etc.

It is emphasized that any combination of modules, as set out above may be envisaged, and various hearing device components may be accommodated in different modules. In addition, binaural hearing devices may comprise different modules and may not necessarily be symmetrical for both ears.

The hearing device comprises a battery which powers the hearing device. The battery may be a rechargeable battery.

The hearing device comprises a processing unit. Naturally, the hearing device may further comprise a microphone and a loudspeaker for processing of an audio signal, a wireless communication unit for enabling communication between two hearing aids and/or an external communication device.

The processing unit receives an input signal, possibly from the microphone, and provide a processed output signal to the loudspeaker. The processed output signal compensates for a hearing loss of the user. Namely, the microphone receives sound and converts it to an electrical signal. The electrical signal is sent to the processing unit, which typically amplifies the electrical signal and removes noise, wherein the amplification and other signal processing depends on hearing loss of the user. The processing unit sends the processed signal to the speaker. The speaker then converts the processed signal into sound and provides it to the user.

The processing unit may comprise a module for processing of the audio signal and a module for processing of other signals, such as wireless signals. The processing unit may comprise a module connected to the battery and which obtain information related to the battery, such as a charging mode, battery level, battery life, etc. The processing unit may comprise a GPS sensor.

The application is configured to transmit a status request from the electronic device to the hearing device. The application may transmit the status request via a wireless protocol such as Bluetooth (BT), Bluetooth Low Energy (BLE), or the like. In the present context, the term "status request" is to be interpreted as an enquiry about certain information related to the hearing device. This status request may be transmitted only after the electronic device and the hearing device are paired. The two devices may be paired once and then continue to communicate until one of the two devices, e.g., runs out of battery. The status request may contain various sub-requests directed to a battery level of the hearing device, a GPS location of the hearing device, information about charging, is the hearing device in use, and/or similar. For instance, the status request may be an enquiry of the location of the hearing device, and/or inquiring the battery level, and/or inquiring information regarding whether the hearing device is charging or not.

The application is configured for receiving, at the electronic device, a status response from the hearing device. In response to the status request, the hearing device is configured to send requested information back to the electronic device. The electronic device receives a status response from the hearing device. This information exchange between the electronic device and the hearing device may be performed by Bluetooth Low Energy (BLE). A table may be defined such that a code (e.g. C1) would be the status request for a battery level, another code (C2) could be a charging status, etc. The status response comprises requested information which may be the battery level, the location, information about charging, the hearing device is in use or is not in use, and/or similar and may then be in the form of R1 VALUE1, R2 VALUE2, etc. The status request and the status response correspond to each other. Namely, content of the status response depends on what is requested through the status request.

The application is configured for generating a notification representing instructions for charging the battery. The received status response is then used by the application for generating a notification representing instructions for charging the battery. In order to generate the notification, the application is additionally using predetermined settings of the application. The application may generate the notification by combining and/or comparing the status response and the predetermined settings. In one example, the application may compare the received value for the battery level, R1 VALUE1 and compare it with a threshold value, TH1. If the R1 VALUE1 is, e.g., 20% lower than the TH1, the user will be notified that charging is required.

The notification is generated based on the received status response and predetermined settings of the application. The notification may be intended to prompt the user to charge the hearing device and/or to replace the battery and to possibly provide the user with information about the battery. The notification may alternatively prompt the user to remove the hearing device from a charger. In general, the notification may be related to charging of the battery.

The predetermined settings may be set by the user of the application depending on the user's preferences on how he/she wants to use the application. The predetermined settings may also include information about a type of the hearing aid, a type of the battery, details about battery life span, etc. At any time, the user may change the predetermined settings related to his/her preferences.

By providing the above described application, the user of the hearing device is guided how to control, manage and maintain proper functioning of the hearing device, and in particular how to control and manage charging of the hearing device battery. The application may remind the user to charge the hearing device at a certain point in time regardless of the battery level, such as at a specific time of day, such as when he/she goes to bed. It is an advantage of the present application that it provides a reminder for the user prompting the user to place the hearing device into a charging station when the hearing device is not in use and in that way e.g. prolong the life span of the battery, and/or e.g. ensure that the battery is fully charged for the next day. It is a further advantage of the present application that it provides information related to charging speed of the battery and thereby prompt the user to correctly place the hearing device to ensure optimal charging. It is a further advantage of the present application that it may provide information about the quality of the battery, battery life expiration and inform the user that the battery may need to be exchanged.

In one example, the electronic device, at a predetermined time of the day, may request information about a GPS location of the hearing device. The hearing device may then send its status response informing the electronic device about its location. At the same time, the electronic device may request information about the battery level and the hearing device will send the status of the battery level back to the electronic device. If the GPS location of the hearing device is different from a predetermined location and the battery level is above a predetermined threshold level, the electronic device may postpone generating the notification until the hearing device, i.e. the user, returns to the predetermined location. In the meantime, the electronic device may check the location of the hearing device every 30 minutes, for instance. If the battery level is below the predetermined threshold level, the electronic device will generate the notification regardless of the identified location.

Obtaining the GPS location from the hearing device may be performed in an alternative way. For instance, the application may simply check whether the electronic device and the hearing device are paired. If the two devices are paired, the application will obtain the GPS location from the electronic device, as pairing is typically possible only if the two devices are within a few meters, i.e. at the same location. In this way, there is no requirement that the hearing device comprises a GPS sensor.

The predetermined time of the day may be set by the user. Typically, it may be around the time when the user goes to bed. The predetermined threshold level for the battery may, for instance, be 10% or 15% or 20%. The predetermined battery level may also be set by the user.

In some embodiments, the battery may be a rechargeable battery. The rechargeable battery can be recharged many times. Typically, recharging time when the battery is completely drained is about 3-4 hours. A fully charged battery may provide power to the hearing device for more than 20 hours. The rechargeable battery may last for the entire life of the hearing device, which is typically 4-5 years. The rechargeable battery may be a silver-zinc battery, a lithium-ion battery, etc. The rechargeable battery may be charged with a charging device in a form of a charging station which can receive one or two hearing devices. It is advantageous to have a rechargeable battery in the hearing device as rechargeable batteries produce less waste because it can be recharged with a simple battery charger and reused hundreds or thousands of times. The simple battery charger may have a mating plug matching a socket of the hearing device. Furthermore, the hearing device having the rechargeable battery may last longer compared to standard hearing devices with a battery door, as there is no need for frequent battery replacement and therefore possibility to damage some of the elements of the hearing device.

In some embodiments, the battery may be configured to be inductively charged by a charging device. The charging device inductively charging the battery is typically a charging station or inductive pad. By inductively charging the battery of the hearing device, wear of the hearing device is significantly reduced as there is no need to plug and unplug the hearing device from the charger.

In some embodiments, the received status response may be related to a charging mode of the hearing device. The received status response may comprise information about the charging mode. The charging mode may be: a no-charging mode, full speed charging mode, or slow charging mode. The slow charging mode may occur if the hearing device is not correctly placed into the charging station, i.e. when an inductive coupling between the hearing device and the charging station is not optimized and when there is a spatial mismatch between the battery and inductive coils in the charging station. By knowing the charging mode of the hearing device, the application can generate a corresponding notification without a need for additional information about the hearing device.

In one embodiment, the status response may be that the battery is fully charged. Some batteries may have low tolerance to continued charging after the battery has been fully charged and therefore the application may generate the notification prompting the user to remove the hearing device from the charging device. In this scenario, the notification may be a message displayed on a display of the electronic device stating that the hearing device is to be disconnected from the charging device.

In some embodiments, the received status response may be related to a battery charging level. The status response may be information that the battery level is low, such as below 10%, or that the battery level is high, such as above 60% of above 70%. If the battery charging level is low, the application may generate the notification reminding the user to charge the hearing device regardless of any other information received through the status response. The application may request a new status response within a short time span, e.g. 30 minutes, to check whether the hearing device is charging, and possibly inform the user again if the hearing device is not charging. If the battery level is high, then the application will check additional conditions, such as whether the user is at the predetermined location, whether the hearing device is in the charger, and if so whether the charging is optimal. If charging is not optimal, i.e., if the hearing device is not correctly placed in the charging station, the application may generate the notification informing the user to check the charger and the position of the hearing device. If the charging is not optimal, and the hearing device is correctly placed in the charging station then the application may run tests directed to the battery quality. By knowing the charging conditions of the battery, it is possible to remind the user on time to charge the battery, to adjust position of the hearing device in the charging station, and/or to know battery quality at a present point of time.

In some embodiments, the predetermined settings of the application may comprise a predetermined time of day. In one embodiment, the application will generate the notification for the user at the predetermined time of the day. By sending the notification at the predetermined time of the day, e.g. in the evening, the user is reminded to charge the hearing device and ensure that the battery is full for the next day.

In another embodiment, the predetermined settings may comprise a predetermined location. The predetermined location may be compared with the location obtained in the form of the status response. If the location is the same as the predetermined location, the application may generate the notification for the user prompting him/her to charge the battery. Other conditions may need to be also fulfilled. Alternatively, if the location is not the same as the predetermined location, generation of the notification is postponed. The predetermined location may be the user's home, where the charger is typically placed.

The predetermined settings may be related to a mode of the electronic device, e.g. the electronic device may be in a "do not disturb" mode, or the user sets limitations on the electronic device usage. The user may set options defining when the notification is to be generated, e.g. sending the notification 10, 20, or 30 min after the predetermined time of the day. By allowing the user to define the settings in the application this provides that the application fits user's preferences and habits.

In some embodiments, the notification may be configured to be an audio notification, and/or a visual notification, and/or a haptic notification. An audio notification may e.g. be a sound or a voice alert. The audio notification may be transmitted using a speaker of the electronic device. A visual notification may e.g. be a text message or light pulses on the display of the electronic device. The visual notification may be transmitted using the display or LED light source of the electronic device. A haptic notification may e.g. be vibrations, taps, and similar. The haptic notification may be transmitted using a tactile output generator of the electronic device. The user may decide which type of notifications he/she wants to receive on the electronic device. The type of notifications can be configured in the settings of the application and be part of the predetermined settings. By using different types of notifications, interaction between the user of the electronic device and the hearing device is facilitated.

In some embodiments, generating the notification may comprise generating the notification to the user and/or generating the notification to staff assisting the user. In a preferred embodiment, the notification is generated on an electronic device used by the user of the hearing device. In another embodiment, the notification is generated on an external electronic device used by a person or staff assisting the user of the hearing device. The external device may be in connection with the electronic device which communicated with the hearing device. The electronic device may for instance send a text message to the external device used by staff. A possibility of sending the notification to staff assisting the hearing device user is advantageous as the hearing device user is not required to be familiar with electronic devices of any sort. Namely, elderly people who are not necessarily familiar with electronic devices may use the hearing devices.

In some embodiments, the predetermined settings may be based on a pattern recognition model, the pattern recognition model being based on the user's behaviour. In particular, the pattern recognition model may be based on the use patterns of the hearing device. Normally, the user uses the hearing device throughout a day and then charges it over a night. However, some user's may have different daily routines which may dictate charging of the hearing device. For instance, the user may have a nap in afternoon and that may be the time when charging is performed. The pattern recognition model may be executed on an external computing device which communicates with the hearing device and with the electronic device, such as an external server or a server in a cloud. The hearing device or the electronic device may daily send data log to the external computing device. Based on the data log, the external computing device may create behavioural pattern and then define parameters which are communicated to the electronic device to define predetermined settings. The pattern recognition model is beneficial as it assists the user in defining the predetermined settings in the application. Based on the data log, the model also may determine if there is a problem with the battery, e.g. if the number of battery cells are defective based on data logged during charging. Additionally, the log may be used to determine if the user has treated the hearing aid in accordance to warranty. If the log shows that the hearing aid has been subjected to extreme conditions, the warranty could be dismissed.

In some embodiments, the pattern recognition model may be generated using a machine-learning algorithm. The external computing device may run the machine-learning algorithm and feed the data log thereto. The machine-learning algorithm may learn patterns of user's behaviour observed over a time period (e.g. 1 month) and identify occurrences of the behavioural patterns related to the use of the hearing device and remember the patterns over time in order to identify possible quality reduction, self-discharge, or damage of the battery.

The machine-learning algorithm may comprise construction of tasks that can learn from and make predictions and decisions based on the user's behaviour. Thus, the machine-learning algorithm may provide behavioural patterns, which may be based on data received from the electronic device which records how and when the user charges the hearing device. Further, the machine-learning algorithm may compare the behavioural patterns with a quality of the battery. Based on this, the machine-learning algorithm may adjust or improve its algorithms for calculating the behavioural patterns.

The machine-learning tasks may be classified into three broad categories, depending on the nature of the learning "signal" or "feedback" available to a learning system. These categories may be:

Supervised learning: The external computing device is presented with example inputs and their desired outputs, given by a "teacher", and the goal is to learn a general rule that maps inputs to outputs.

Unsupervised learning: No labels are given to the learning algorithm, leaving it on its own to find structure in its input. Unsupervised learning can be a goal in itself (discovering hidden patterns in data) or a means towards an end (feature learning).

Reinforcement learning: A computer program interacts with a dynamic environment in which it must perform a certain goal, such as determining behavioural patterns to therefore generate a report about a life time of the battery. The program is provided feedback in terms of user evaluation on the effect of the behavioural patterns, as it navigates its problem space.

Another categorization of machine-learning tasks arises when one considers the desired output of a machine-learned system:

In classification, inputs are divided into two or more classes, and the learner must produce a model that assigns unseen inputs to one or more (multi-label classification) of these classes. This is typically tackled in a supervised way. Filtering of types of requests is an example of classification, where the inputs are requests and the classes are for example "times of days when the user charges the hearing device"

In regression, also a supervised problem, the outputs are continuous rather than discrete.

In clustering, a set of inputs is to be divided into groups. Unlike in classification, the groups are not known beforehand, making this typically an unsupervised task.

Density estimation finds the distribution of inputs in some space.

Dimensionality reduction simplifies inputs by mapping them into a lower-dimensional space.

In some embodiments, the charging device may be configured to send charging pulses to the hearing device, the hearing device being configured to generate the status response based on the charging pulses. The charging pulses ensure charging of the battery. The charging pulses may have a defined voltage. Depending on placement of the hearing device in the charger, the hearing device may receive voltage which is lower than the defined voltage. This may be an indication that the hearing device is not placed correctly in the charger. If the hearing device comprises two hearing aids, it may happen that only one of the two aids receive lower voltage. In this situation, the hearing device generates the status response related to the strength/voltage received. This information is then used by the application to generate a corresponding notification informing the user that the charging device is not charging properly. Having the charging device which sends charging pulses to the hearing device is beneficial as the application is can determine whether the hearing device is correctly connected to the charger.

In one embodiment, if the hearing device is not connected to the charger, the charger may send probe pulses to the hearing device at intervals. The probe pulses may be ping pulses searching for the hearing device. The probe pulses may be of interest especially when the hearing device is in the vicinity of the charger but not charging. The hearing device may detect these pulses and send the status response to the electronic device. Based on the received status response the application may then generate a notification for the user to connect the hearing device to the charger. This could be the case, if the user has forgotten to place the hearing device in the charger for charging, but just placed the hearing device next to charger on a table.

In a second aspect, a method for controlling charging of a hearing device is provided, the hearing device being configured to be worn by a user, the hearing device comprising a battery and a processing unit configured to receive an input signal and provide a processed output signal for compensating a hearing loss of the user; the method comprising:
  transmitting a status request from an electronic device to the hearing device, the electronic device being configured to execute a software application;
  sending a status response from the hearing device to the electronic device;
  receiving, at the electronic device, the status response from the hearing device;
  generating a notification representing instructions for charging the battery, the notification being generated based on the received status response and predetermined settings of the software application.

In a third aspect, a system includes a hearing device and a charging device:
  the hearing device being configured to be worn by a user, the hearing device comprising a battery and a processing unit configured to receive an input signal and provide a processed output signal for compensating a hearing loss of the user, the hearing device being configured to communicate a status response to an electronic device;
  the charging device being configured to send charging pulses to the hearing device when the hearing device is arranged within a predefined distance from the charging device;
  wherein the hearing device is further configured to detect the charging pulses and, based on their intensity, communicate the status response to the electronic device.

In one embodiment, the system further comprises the electronic device. The electronic device may be configured to communicate with the charging device. The electronic device may further be configured to execute a software application according to the first aspect.

The method according to the second aspect may be carried out by the application according to the first aspect. In addition, the system according to the third aspect may utilize the application according to the first aspect. The skilled person would therefore readily understand that any feature described in combination with the first aspect could also be combined with the second aspect and third aspect, and vice versa. Accordingly, the remarks set forth above with reference to the first aspect are equally applicable on the second and third aspects.

The present disclosure relates to different aspects including the application described above and in the following, and corresponding methods and system, each yielding one or more of the benefits and advantages described in connection with the first mentioned aspect. In addition, each aspect has one or more embodiments corresponding to the embodiments described in connection with the first mentioned aspect and/or disclosed in the appended claims.

The present disclosure further relates to a computer-implemented method comprising the steps:
  defining charging conditions related to charging of a hearing device;
  transmitting a status request from an electronic device to the hearing device;
  receiving, at the electronic device, a status response from the hearing device;
  comparing the charging conditions with the received status response;
  generating a notification representing instructions for charging the hearing device, the notification being generated based on the comparison of the received status response and charging conditions.

The charging conditions may be an equivalent to the predetermined settings defined in relation to the first aspect.

The present disclosure further relates to a computer program comprising instructions, which when the program is executed by a computer, cause the computer to carry out the steps:
  defining charging conditions related to charging of a hearing device;
  transmitting a status request from the computer to the hearing device;
  receiving, at the computer, a status response from the hearing device;
  comparing the charging conditions with the received status response;
  generating a notification representing instructions for charging the hearing device, the notification being generated based on the comparison of the received status response and charging conditions.

The computer may be a smart phone, tablet, laptop, or a similar device. The hearing device may be a hearing aid, a headset, a binaural hearing system, etc.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 1:
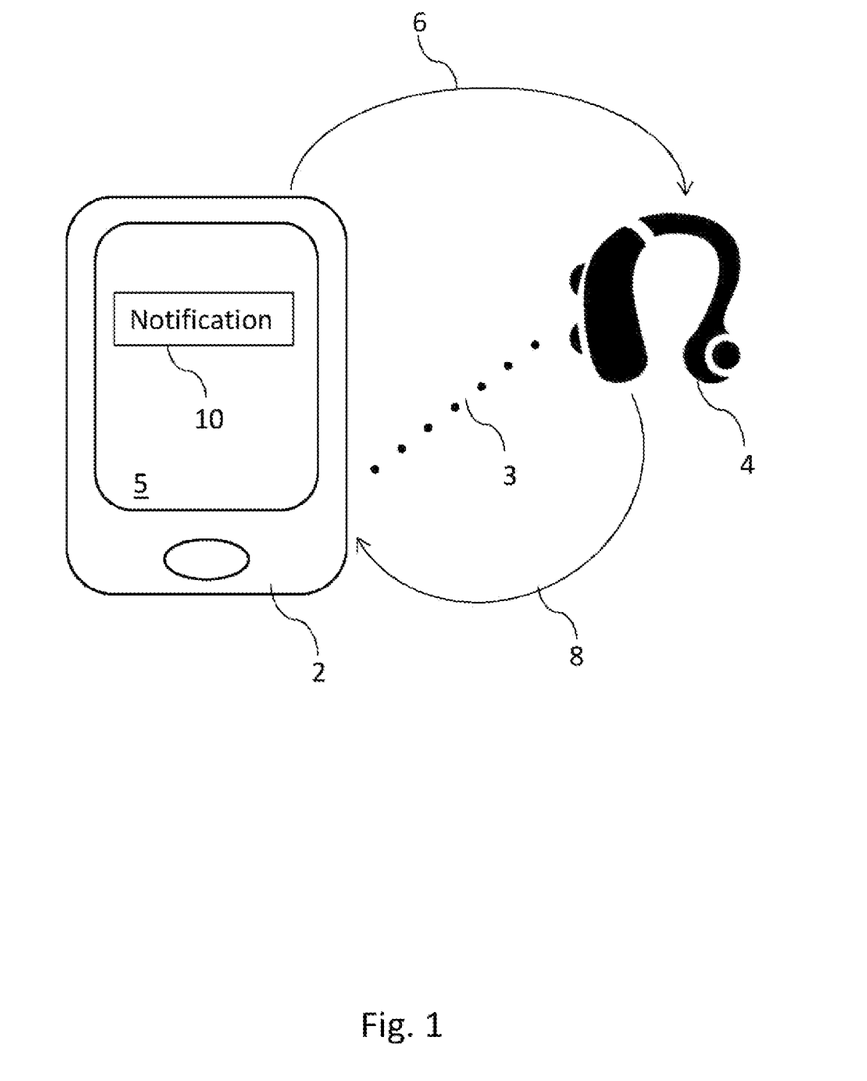
FIG. 1 schematically illustrates communication between an electronic device and a hearing device, FIG. 2 schematically illustrates a block diagram of a hearing instrument with a battery, FIG. 3 schematically illustrates an exemplary system comprising a hearing device, charging device, and electronic device, FIG. 4 schematically illustrates wireless communication between an electronic device and a binaural hearing device, FIGS. 5a-5c schematically illustrate examples of notifications generated by an electronic device.

FIG. 1 schematically illustrates communication between an electronic device 2 and a hearing device 4. The two devices are configured to communicate with each other. The communication may be established via wireless connection 3. The hearing device 4 is configured to be worn by a user who is typically a hearing-impaired person. The hearing device 4 then compensates for a hearing loss of the user. The hearing device 4 comprises a battery. The electronic device 2 runs an application which manages communication between the two devices. The application is configured to transmit a status request 6 from the electronic device 2 to the hearing device 4 and then receiving a status response 8 from the hearing device 4. The application then generates a notification 10. The electronic device 2 may have a display 5 on which the notification 10 is visually displayed. The notification 10 is generated based on the status response 8 and predetermined settings of the application and represents instructions related to charging the battery of the hearing device 4. The notification 10 is intended to remind the user to charge the hearing device 4. The electronic device 2 may be a device frequently used by the user and therefore it is beneficial to have the application executed on the frequently used electronic device and which reminds the user to charge the hearing device and make sure that the hearing device does not run out of battery.

FIG. 1 shows the hearing device 4 as an RIC hearing device. It is emphasized that the hearing device 4 may be any other type of a hearing device, such as a BTE, ITE, CIC hearing device, etc.

Figure 2:
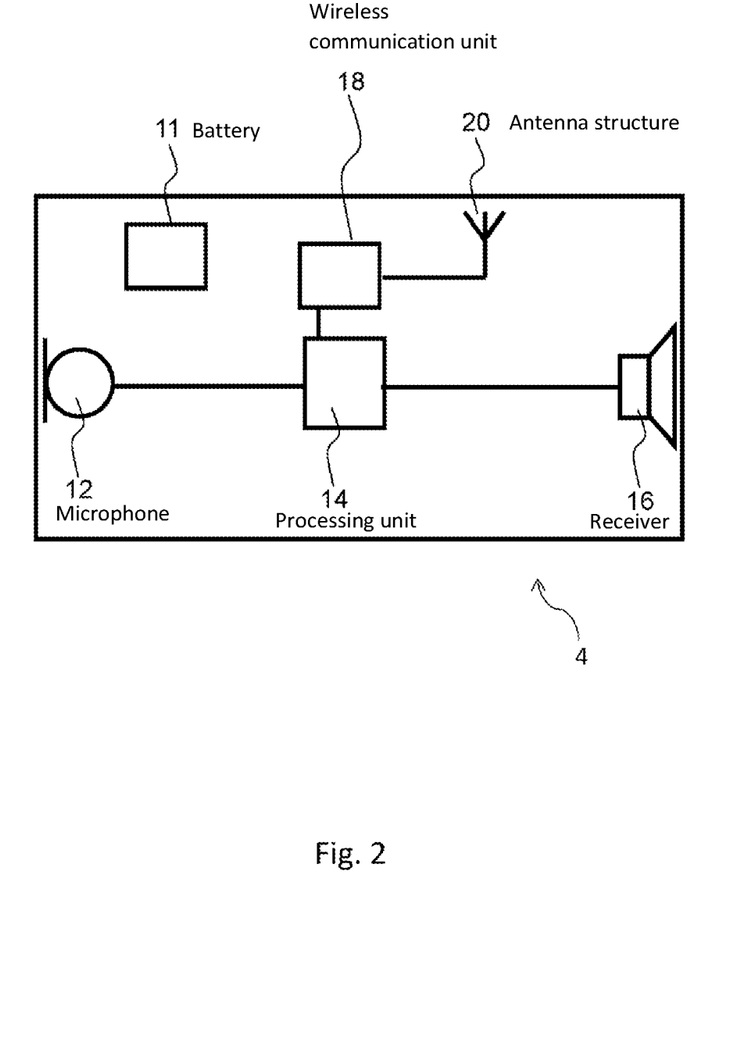

FIG. 2 schematically illustrates a block diagram of a hearing device 4 with a battery 11. The battery 11 may be a rechargeable battery. The hearing device 4 comprises a microphone 12, for receiving an input signal and converting it into an audio signal. The audio signal is provided to a processing unit 14 for processing the audio signal and providing a processed output signal for compensating a hearing loss of a user of the hearing device 4. A receiver 16 is connected to an output of the processing unit 14 for converting the processed output signal into an output sound signal, e.g. a signal modified to compensate for a user's hearing impairment. Typically, the receiver 16 comprises a transducer, and the receiver 16 is often referred to as a speaker. The processing unit 14 may comprise elements such as amplifiers, compressors, noise reduction systems, etc. The hearing device 2 comprises a battery 11. The hearing device 4 may further comprise a wireless communication unit 18 for wireless data communication interconnected with an antenna structure 20 for emission and reception of an electromagnetic field. The wireless communication unit 18, such a radio or a transceiver, connects to the processing unit 14 and the antenna structure 20, for communicating with external devices, or with another hearing device, such as another hearing aid located at another ear, typically in a binaural hearing system. The hearing device 4 may comprise two or more antenna structures. A first antenna may be for connecting to a phone of the user, a second antenna may be for connection with another hearing aid, and a third antenna may be for connecting with an external device, e.g. a microphone worn by the user's spouse. In some embodiments, the hearing device 4 may also comprise an antenna for establishing wireless communication with a charger for charging the battery 11 and for receiving probe pulses from the charger.

The hearing device 4 may be a behind-the-ear hearing device, and may be provided as a behind-the-ear module. The hearing device 4 may be an in-the-ear hearing device and may be provided as an in-the-ear module. Alternatively, parts of the hearing device 4 may be provided in a behind-the-ear module, while other parts, such as the receiver 16, may be provided in an in-the-ear module.

Figure 3:
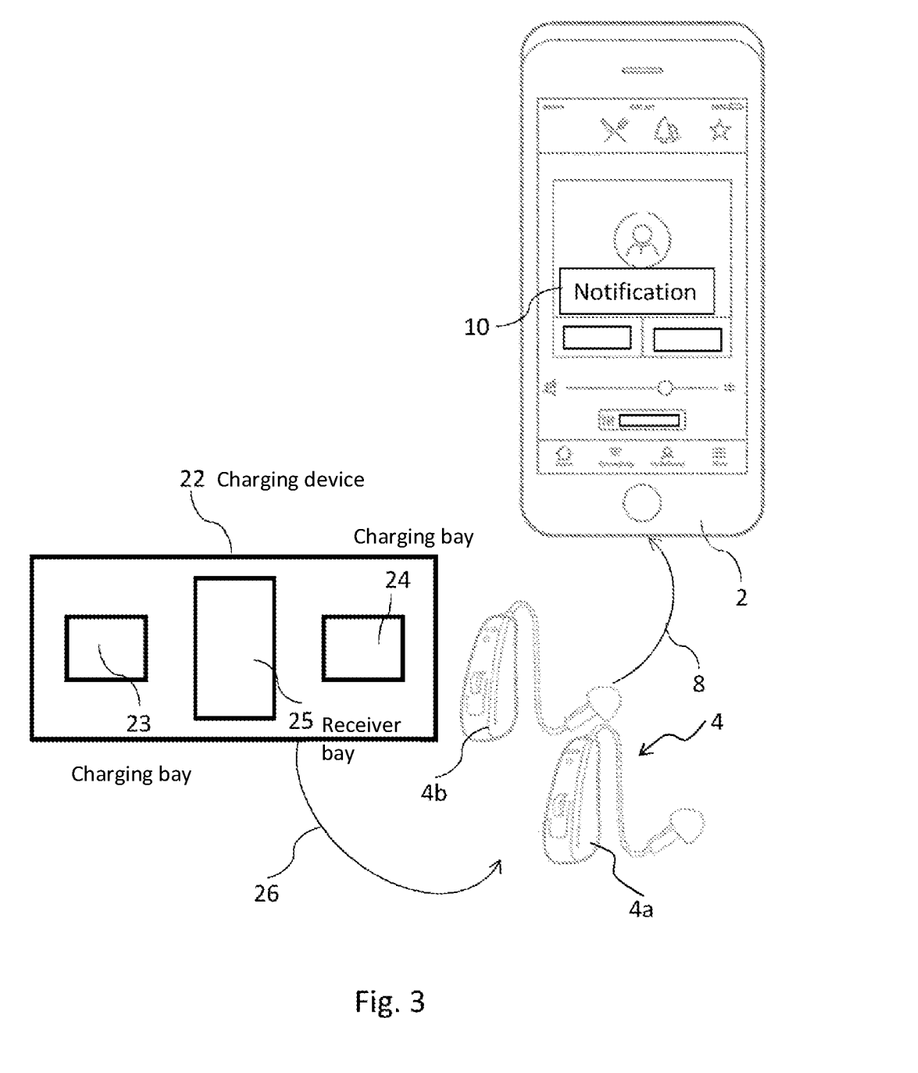

FIG. 3 schematically illustrates an exemplary system comprising a hearing device 4, charging device 22, and electronic device 2. The hearing device 4 is illustrated to comprise two hearing aids 4a and 4b for the left and right ear of the user. The hearing aids 4a and 4b may be a RIC type hearing devices having a receiver module being separate from a module comprising the battery. The charging device 22 is configured to receive the hearing aids 4a and 4b into charging bays 23 and 24 and corresponding receiver modules into a receiver bay 25. Other forms of the charging device 22 may also be used and they may be manufactured relative to types of hearing aids to be charged. The charging device 22 may be connected via wire to a power socket/point/outlet in the building. The charging device 22 may be a charging case which may also be charged with or without the hearing device 4 being inside the charging bays 23, 24, i.e. the charging case may have its own rechargeable power source. The charging device 22 may send probe pulses 26 to the hearing device 4 at intervals. The probe pulses 26 may be ping pulses searching for the hearing device 4. The probe pulses 26 may be of interest especially when the hearing device 4 is in the vicinity of the charger 22 but not charging. The hearing device 4 may detect these pulses 26 and send the status response 8 to the electronic device 2. Based on the received status response 8 the application running on the electronic device 2 may then generate a notification 10 for the user to connect the hearing device 4 to the charger 22.

Figure 4:
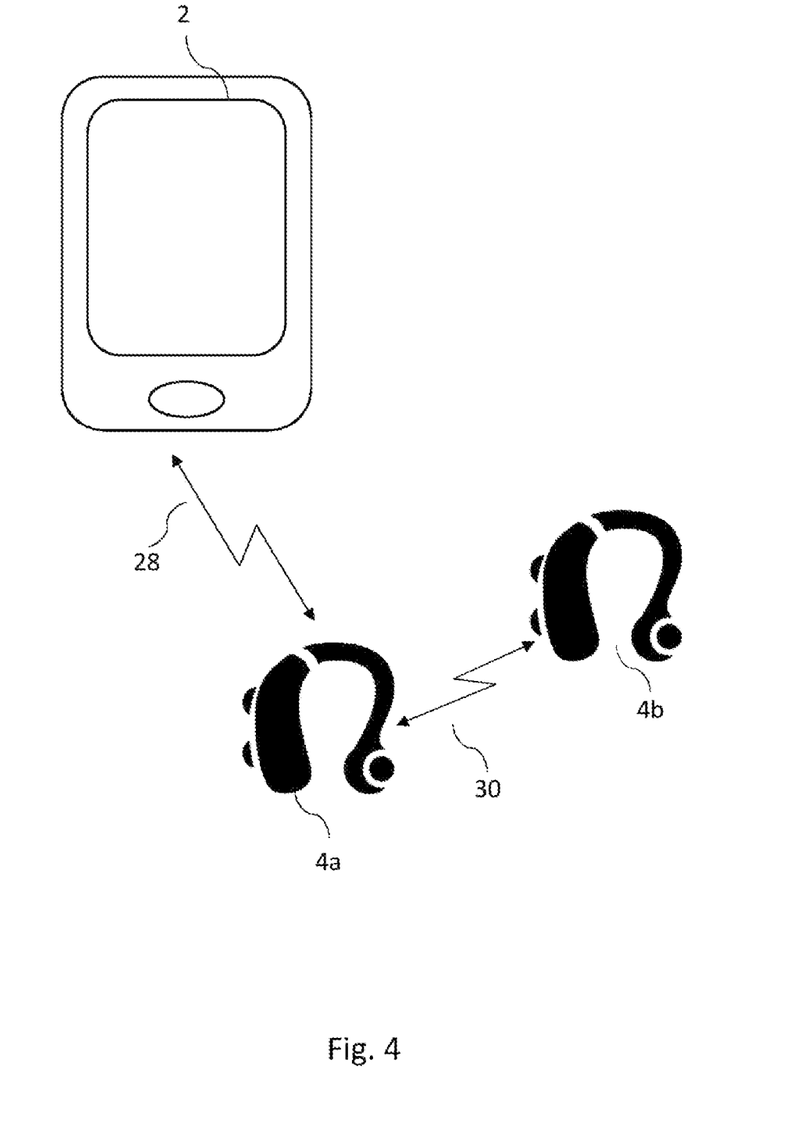

FIG. 4 schematically illustrates wireless communication between an electronic device 2, e.g. a smart phone, and a binaural hearing device 4, comprising a left and right hearing aid, 4a and 4b. The smart phone 2 may be in wireless communication with the left hearing aid 4a via, e.g. Bluetooth connection 28 for exchanging various information. The smart phone 2 may send audio streams to the left hearing aid 4a, status requests, and/or parameters for change of a mode of the hearing aid 4a. The left hearing aid 4a may send status responses to the smart phone 2.

The left hearing aid 4a may be in wireless communication with the right hearing aid 4b, also via Bluetooth connection 30. The left hearing aid 4a may then mirror information received from the smart phone 2 to the right hearing aid 4b. In some embodiments, the right hearing aid 4b is alternatively and/or additionally also in communication with the smart phone 2 in a similar manner as with the left hearing aid 4a.

Figure 5A:
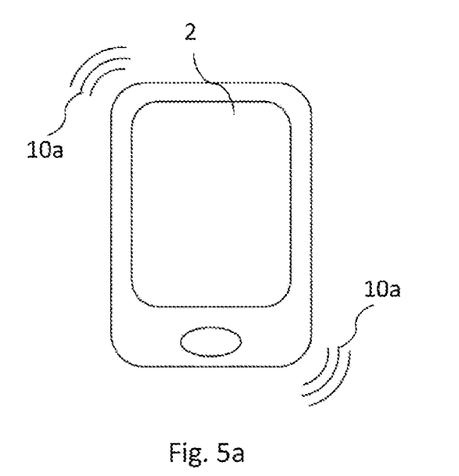
Figure 5B:
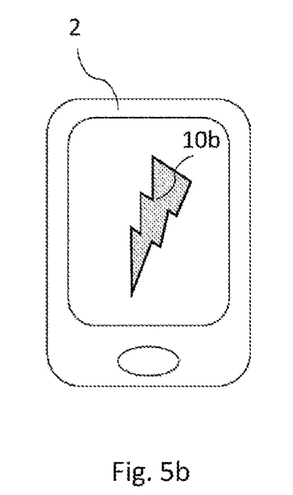
Figure 5C:
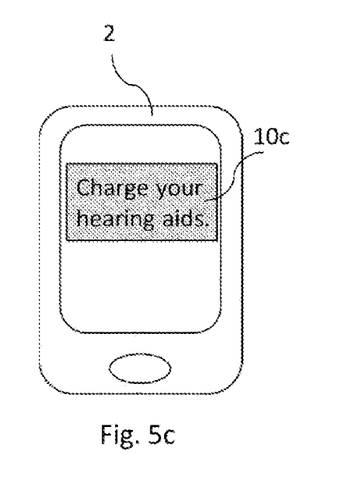

FIG. 5 schematically illustrates examples of notifications 10 generated by an electronic device 2, e.g. a smart phone. The notification may be configured to be an audio notification, and/or a visual notification, and/or a haptic notification. An audio notification may e.g. be a sound or a voice alert. The audio notification may be transmitted using a speaker of the electronic device. A visual notification may e.g. be a text message or light pulses on the display of the electronic device. The visual notification may be transmitted using the display or LED light source of the electronic device. A haptic notification may e.g. be vibrations, taps, and similar. The haptic notification may be transmitted using a tactile output generator of the electronic device. FIG. 5a illustrates the smart phone 2 generating a haptic notification 10a. Namely, when a software application executed on the smart phone 2 determines, based on a feedback from a hearing device, that a notification to the user of the hearing device is to be sent, the smart phone may vibrate, remanding the user to charge the hearing device. Alternatively, the notification may be in a form of blinking light 10b, as illustrated in FIG. 5b. In yet one alternative, the user may receive a textual notification on the smart phone 2 with instruction 10c to charge the hearing aid, as illustrated in FIG. 5c.

Figure 6:
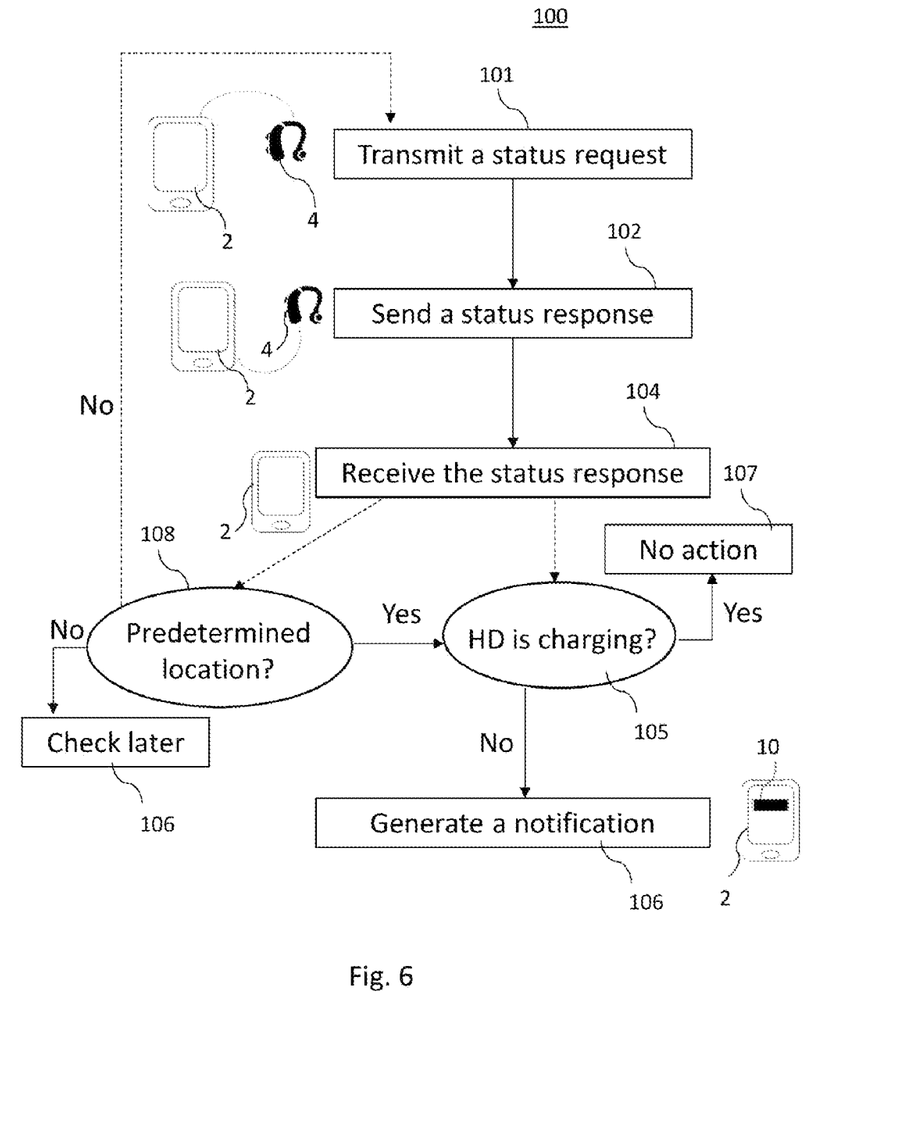
FIG. 6 illustrates a flow chart of a method according to one embodiment.

FIG. 6 illustrates a flow chart of a method 100 according to an embodiment. The method provides controlling charging of a hearing device, wherein the hearing device is configured to be worn by a user, comprises a battery and a processing unit configured to receive an input signal and provide a processed output signal for compensating a hearing loss of the user. The method is executed by at first transmitting 101 a status request from the electronic device 2 to the hearing device 4. The hearing device 4 then sends 102 a status response to the electronic device 2 after where, the electronic device 2 receives 104 the status response from the hearing device 4. Upon receiving 104 the status response, the electronic device 2, i.e. a software application executed on the electronic device 2, may preform various checks.

In one scenario, the electronic device may only check if the hearing device 4 is charging 105. If it is not charging, the electronic device generates 106 a notification 10 representing instructions for charging the battery. However, if the hearing device is charging then the electronic device may perform no action 107. Alternatively, the electronic device may check the speed of charging and only then decide whether to send the notification 10 or not. The notification 10 is generated based on the received status response and predetermined settings of the software application.

In another scenario, the electronic device may first check if the user is at the predetermined location 108. If the user is not at the predetermined location, the software application may postpone generation of the notification 10 and/or it may transmit 100 the status request to the hearing device after some time, e.g. after 30 minutes. If, on the other hand, the user is at the predetermined location, the software application may perform some other checks, e.g. check if the hearing device is charging 105 and only then may perform further steps in accordance to the scenario described above.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications, and equivalents.

LIST OF REFERENCES 2 electronic device, e.g. smart phone
3 wireless connection
4 hearing device
4a, 4b left and right hearing aid
5 display
6 status request
8 status response
10 notification
12 microphone
14 processing unit
16 receiver
18 wireless communication unit
20 antenna structure
22 charging device
23, 24 charging bays
25 receiver bay
26 probe pulses
28, 30 Bluetooth connection
100 method
101 transmitting a status request
102 sending a status response
104 receiving the status response
105 hearing device is charging
106 generating a notification
107 performing no action
108 checking predetermined location

The invention claimed is:

1. An electronic device configured to communicate with a hearing device, the hearing device comprising a speaker configured to provide sound for compensating a hearing loss of a user, the electronic device being a handheld mobile device and comprising:
    a signal transmitter configured to transmit a status request to the hearing device; and
    a notification generator configured to generate a notification to remind a user to charge a battery of the hearing device, wherein the notification generator is configured to generate the notification based on a status response transmitted from the hearing device to the electronic device while the battery of the hearing device is not being charged or not being charged properly;
    wherein the signal transmitter of the electronic device is configured to transmit the status request to the hearing device after the electronic device determines that the battery of the hearing device is not being charged or not being charged properly.

2. The electronic device according to claim 1, wherein the notification generator is configured to generate the notification based on the status response received from the hearing device, and also based on a predetermined setting of an application in the electronic device.

3. The electronic device according to claim 2, wherein the predetermined setting of the application comprises a predetermined time of day.

4. The electronic device according to claim 2, wherein the predetermined setting is based on a pattern-recognition model.

5. The electronic device according to claim 4, wherein the pattern-recognition model is based on a behavior of the user.

6. The electronic device according to claim 4, wherein the pattern-recognition model is based on a machine-learning algorithm.

7. The electronic device according to claim 1, wherein the status response received from the hearing device is related to a charging mode of the hearing device.

8. The electronic device according to claim 1, wherein the status response received from the hearing device is related to a battery charging level.

9. The electronic device according to claim 1, wherein the notification comprises an audio notification, a visual notification, a haptic notification, or any combination of the foregoing.

10. The electronic device according to claim 1, wherein the electronic device is configured to output the notification for presentation to the user.

11. The electronic device according to claim 1, wherein the electronic device is configured to output the notification for presentation to a staff assisting the user.

12. The electronic device of claim 1, wherein the electronic device is outside a charging device that is configured to charge the battery of the hearing device.

13. A system comprising the electronic device of claim 1, and the hearing device.

14. The system of claim 13, further comprising a charging device.

15. The system of claim 14, wherein the charging device comprises a coil and is configured to send a charging pulse to the hearing device.

16. The system of claim 14, wherein the charging device comprises a coil, and is configured to inductively charge the battery of the hearing device via the coil.

17. A system comprising the electronic device of claim 1 and a charging device for charging the hearing device, wherein the charging device comprises a coil or a pad.

18. A method performed by an electronic device, the electronic device being a handheld mobile device, the method comprising:
  outputting, by the handheld mobile device, a status request for transmission to a hearing device;
  obtaining, by the handheld mobile device, a status response outputted by the hearing device, wherein the status response from the hearing device is obtained by the handheld mobile device while the battery of the hearing device is not being charged or not being charged properly; and
  generating a notification to remind a user to charge the battery of the hearing device, wherein the notification is generated based on the status response outputted by the hearing device;
  wherein the act of outputting the status request to the hearing device is performed by the handheld mobile deice after the handheld mobile device determines that the battery of the hearing device is not being charged or not being charged properly.

19. The method of claim 18, further comprising obtaining information by the handheld mobile device, the information informing the handheld mobile device that the battery of the hearing device is not being charged or not being charged properly, wherein the act of outputting the status request is performed by the handheld mobile device after the information is obtained by the handheld mobile device.

20. A product having a non-transitory processor-readable medium storing a set of instructions, an execution of which by a processing unit will cause the method of claim 18 to be performed.

21. A system comprising:
  a hearing device configured to be worn by a user, the hearing device comprising a battery and a processing unit configured to receive an input signal and provide a processed output signal for compensating a hearing loss of the user, the hearing device being configured to wirelessly communicate a status response to an electronic device while the hearing device is not being charged or not being charged properly; and
  a charging device comprises a coil and is configured to send a pulse to the hearing device;
  wherein the hearing device is configured to send information to the electronic device, the information indicating that the hearing device is not being charged or not being charged properly, and wherein the hearing device is configured to wirelessly communicate the status response to the electronic device after sending the information to the electronic device.

22. The system of claim 21, wherein the pulse comprises a charging pulse, and wherein the charging device is configured to send the charging pulse to the hearing device via the coil when the hearing device is within a predefined distance from the charging device.

23. The system of claim 21, wherein the electronic device is outside the charging device, and wherein the hearing device is configured to communicate the status response to the electronic device that is outside the charging device.

* * * * *